Feb. 7, 1956                    W. R. STUEBING                    2,733,834
                        MEANS FOR AUTOMATICALLY ALIGNING
                           AND FEEDING ELONGATE ELEMENTS
Filed Oct. 25, 1950                                              5 Sheets-Sheet 1

INVENTOR.
WILLIAM R. STUEBING
BY
J. Warren Kinney Jr.
ATTORNEY

Feb. 7, 1956
W. R. STUEBING
2,733,834
MEANS FOR AUTOMATICALLY ALIGNING
AND FEEDING ELONGATE ELEMENTS
Filed Oct. 25, 1950
5 Sheets-Sheet 2
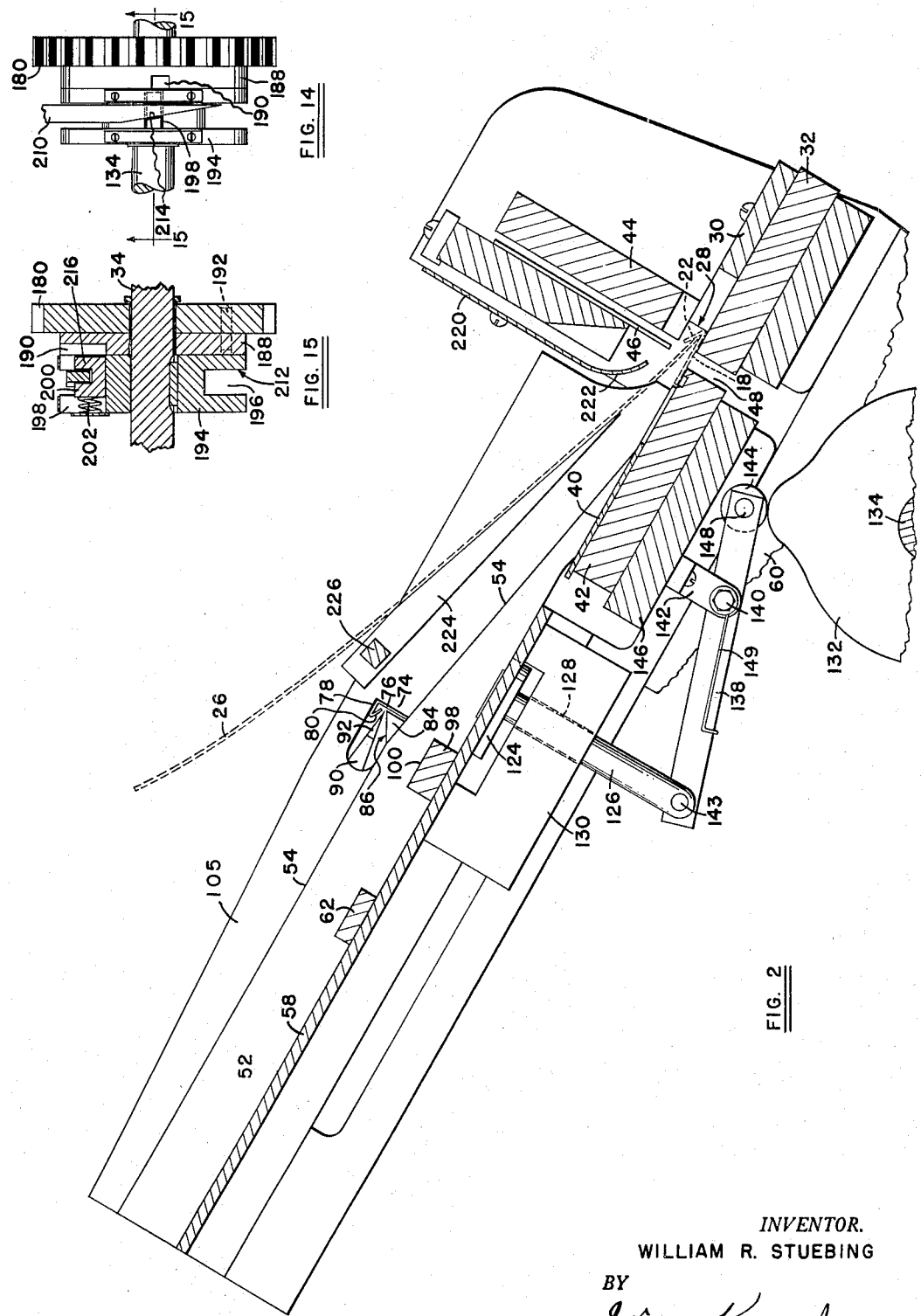
INVENTOR.
WILLIAM R. STUEBING
BY
*J. Warren Kinney, Jr.*
ATTORNEY Feb. 7, 1956 W. R. STUEBING 2,733,834
MEANS FOR AUTOMATICALLY ALIGNING
AND FEEDING ELONGATE ELEMENTS
Filed Oct. 25, 1950 5 Sheets-Sheet 3
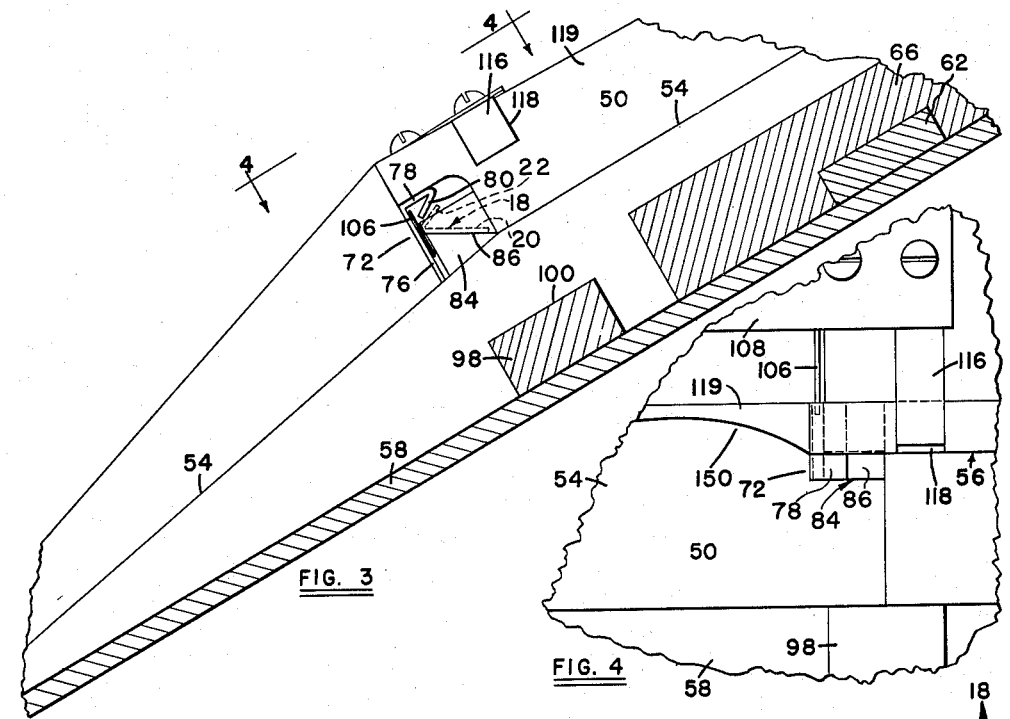
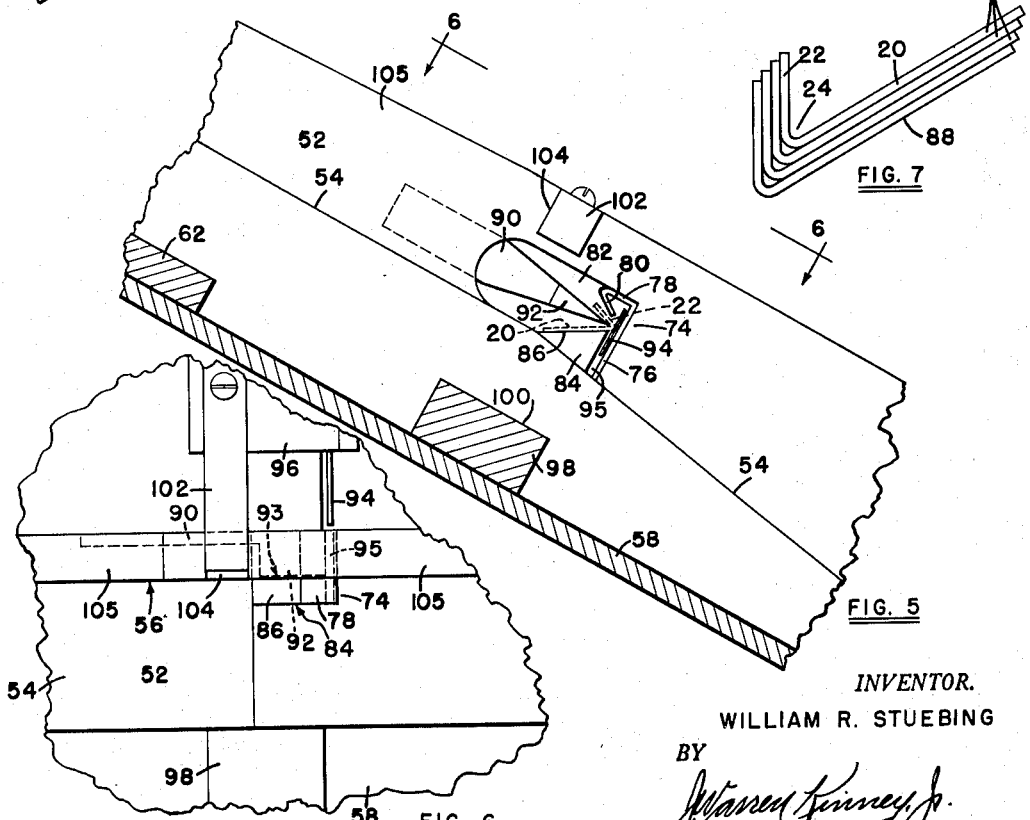
INVENTOR.
WILLIAM R. STUEBING

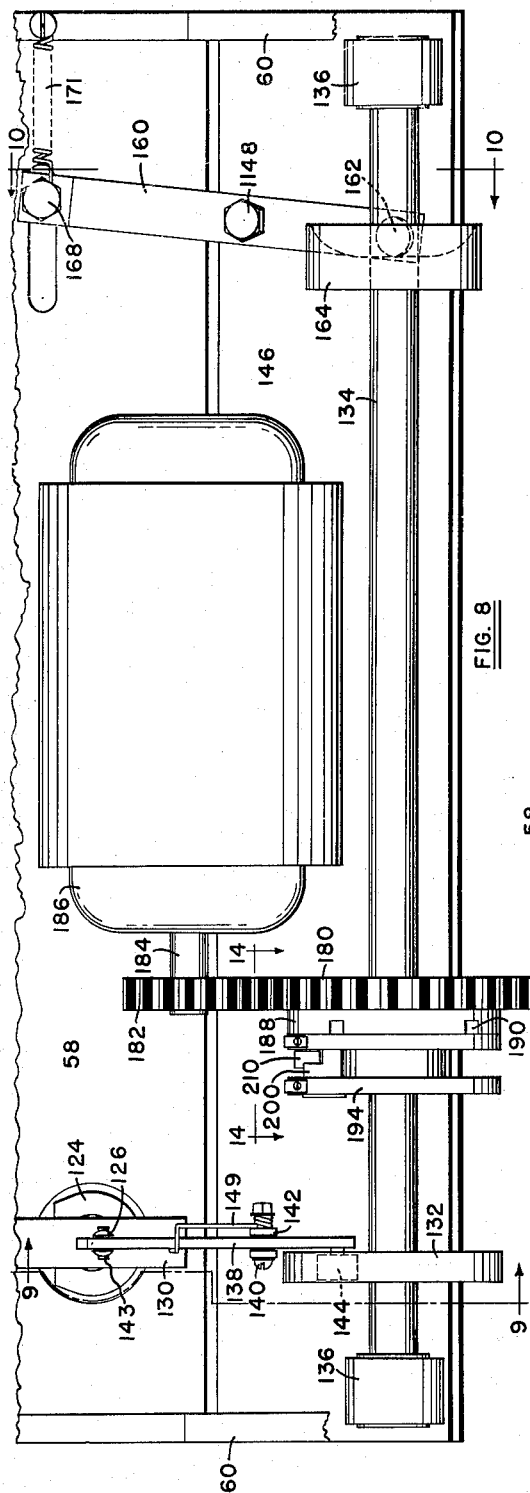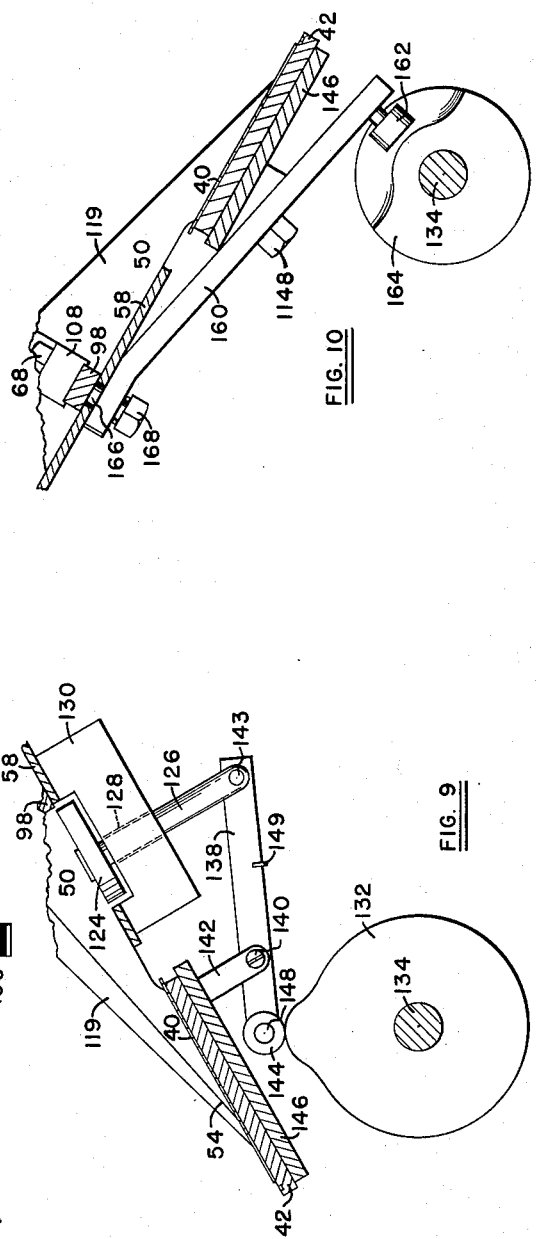
FIG. 8
FIG. 10
FIG. 9
INVENTOR.
WILLIAM R. STUEBING

INVENTOR.
WILLIAM R. STUEBING
BY
ATTORNEY

United States Patent Office 2,733,834
Patented Feb. 7, 1956

2,733,834

MEANS FOR AUTOMATICALLY ALIGNING AND FEEDING ELONGATE ELEMENTS

William R. Stuebing, Cincinnati, Ohio

Application October 25, 1950, Serial No. 192,054

12 Claims. (Cl. 221—212)

This invention relates to means for feeding or selectively removing the lowermost of a plurality of similar nested strips and of then presenting said selected strip in predetermined alignment for subsequent use.

An object of the invention is to provide a device into which a plurality of similar nested pieces of strip material may be fed and which will automatically select and feed the foremost of said strips in a pre-aligned condition for further processing.

Another object of the invention is to teach a method of effectively and efficiently removing the foremost strip from a plurality of similar strips in nested condition, whereby the strips will be fed in a foolproof manner one at a time from the stack of nested strips.

A further object of the invention is to provide a strip-feeding device the operating characteristics of which are positive and foolproof.

Still a further object of the invention is to provide a strip separating and feeding device having the hereinabove described characteristics which includes means for adapting the device for handling strips of various lengths, widths and thicknesses, thereby greatly enhancing its utility.

These and other objects are attained by the means described herein and as more fully disclosed in the accompanying drawings, in which:

Fig. 2 is a sectional view taken on line 2—2 of Fig. 1.

Fig. 3 is an enlarged sectional view taken on line 3—3 of Fig. 1.

Fig. 4 is a partial plan view of Fig. 3.

Fig. 5 is an enlarged sectional view taken on line 5—5 of Fig. 1.

Fig. 6 is a partial plan view of Fig. 5.

Fig. 7 is an enlarged end view of a plurality of similar nested edging strips of the type adapted to be fed by the present device.

Fig. 8 is a bottom plan view illustrating the driving mechanism for the device of Fig. 1.

Fig. 9 is a sectional view taken on line 9—9 of Fig. 8.

Fig. 10 is a sectional view taken on line 10—10 of Fig. 8.

Fig. 14 is a plan view taken on line 14—14 of Fig. 8.

Fig. 15 is a sectional view taken on line 15—15 of Fig. 14.

Figure 1:
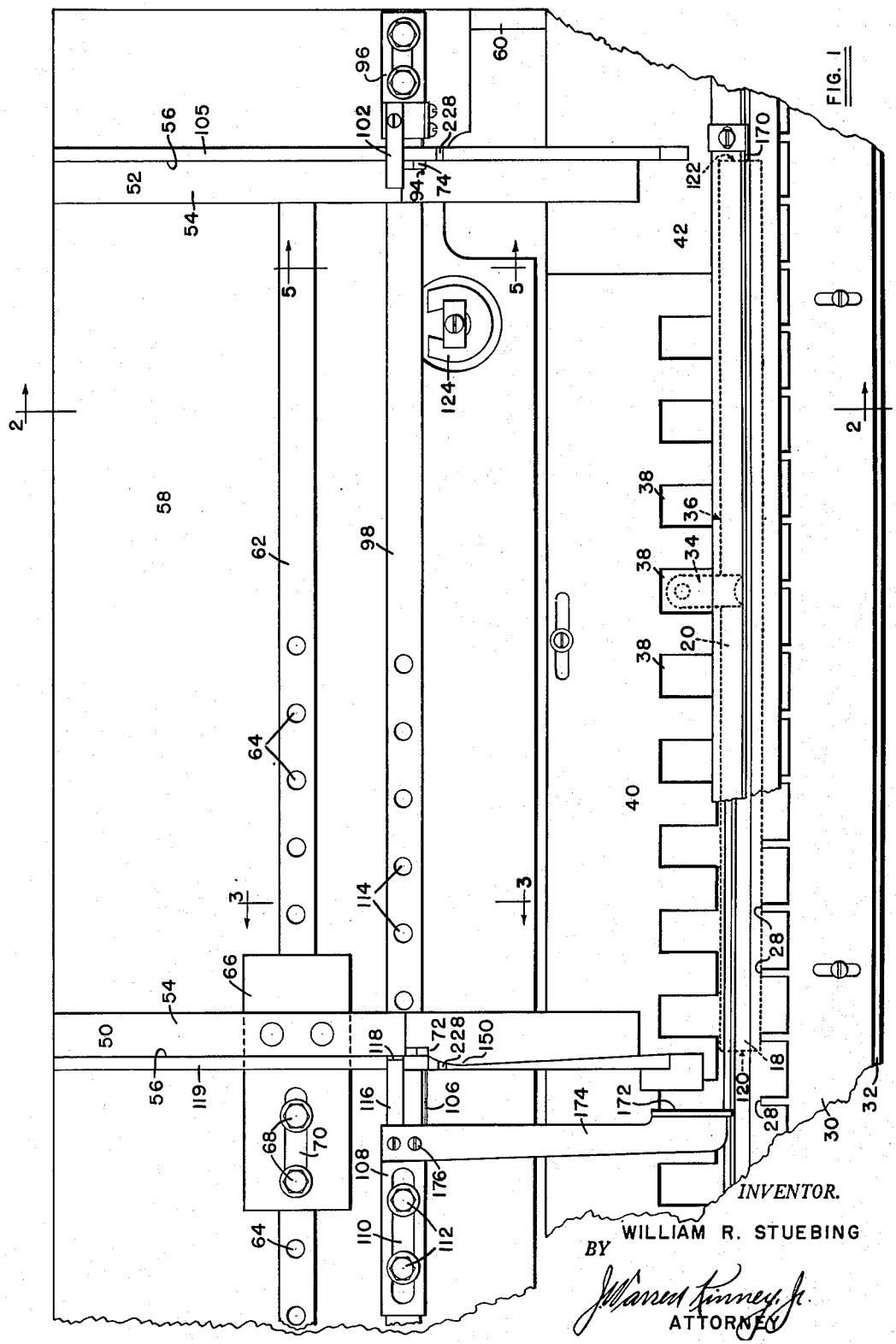
Fig. 1 is a partial view of the device embodying the teachings of the present invention associatd with a strip crimping device.

Broadly speaking, the device comprises guide means for supporting and gravitationally feeding a plurality of similar strips or elongate elements to an ejector assembly which is constructed and arranged to selectively remove one of the elongate elements from the others and then discharge it onto a lower portion of the same guide means for gravitational delivery in predetermined alignment to another device or for other subsequent use.

Solely by way of example, and not by way of restriction, I shall describe the feed and operating characteristics of my device in terms of and as applied to a metal edger for crimpling a metallic edging strip to the edge of a plurality of sheets such as, by way of example, calendar sheets. Such edging strips 18 are prefabricated to desired length and may comprise a body panel or portion 20 and an upturned lip or leg 22 defining an elongated notch or pocket 24, see Fig. 7, into which one edge of a plurality of calendar sheets may be received preparatory to subjecting the strip to a crimping operation for permanently securing the edging strip to the sheets.

With particular reference now to Fig. 2, the numeral 26 denotes generally a plurality of calendar sheets the upper edges of which have been received within the pocket portion of elongate strip 18 the apex of which engages forward edges 28 of finger bar 30 adjustably secured to and carried by front pressure bar 32. A hanger tab 34, suitably fastened to body panel 20 and projecting outwardly from edge 36, is loosely receivable within a tab pocket 38 provided in plate 40 which overlies and is carried by rear pressure bar 42.

The numeral 44 denotes a hammer bar mounted for reciprocating motion between the fully elevated position of Fig. 2 to a lowered position for smashing leg 22 onto the ends of the calendar sheets. The hammer bar may then be returned to its fully elevated position after which the crimping blade 46 may be lowered to fold the edging strip around the ends of sheets 26 by forcing the strip and sheets downwardly into the opening 48 between adjacent faces of the front and rear pressure bars. Upon withdrawal of the blade the front pressure bar may be moved toward the rear pressure bar for completing the final fold, thereby securely anchoring the strip to sheets 26.

It should be clearly understood, however, that the present invention is neither directed to nor concerned with the structural details of the strip crimping device which may, if desired, be similar to the device illustrated in the W. Stuebing, Sr. Patent No. 1,057,295 dated March 25, 1913.

With particular reference now to Figs. 1, 11, 12 and 13, the numerals 50 and 52 denote a pair of laterally spaced inclined guides each including a supporting portion 54 and an aligning portion 56 at substantial right angles therewith. In the preferred embodiment of the invention guides 50 and 52 may be mounted upon the upper surface of a table 58 suitably mounted to a pair of laterally spaced side support members 60, which it spans, Fig. 2.

As best illustrated in Fig. 1, an elongated track member 62 containing a plurality of axially aligned, laterally spaced threaded holes 64 is fixedly secured to and carried by table 58. Guide 52 may be fixedly secured to table 58 and track member 62 whereas guide 50 is secured to and carried by block 66, the lower surface of which is provided with a slotted portion dimensioned to receive and slidably engage the track member. Block 66 and its associated guide may be securely though releasably secured to the track member by suitable fastening means, such as, by way of example, bolts 68 which extend through slotted portion 70 of the block and engage threaded holes 64. Thus the lateral spacing between the guides may be varied to accommodate strips of different lengths.

A pair of axially aligned stops denoted generally by the numerals 72 and 74 are provided in interfering relationship with guides 50 and 52, respectively, for engaging the opposite ends of the foremost of a plurality of similar elongate edging strips supported in nested condition on the guides with their longitudinal axes in substantial parallelism and with their respective ends slidably engaging the vertical or aligning portions 56 of the guides.

With particular reference now to Figs. 5 and 6, it will be noted that stop 74 may, if desired, be fabricated whereby to include a front or interfering portion 76 engageable by the apex of the foremost edging strip, an upper portion 78 and an inturned lip 80, as illustrated. An aperture 82 may be provided in vertical wall 105 of guide 52 for facilitating mounting of a block 84 having an inclined face 86 upon which the outer face 88 (see Fig. 7) of the lowermost elongate strip is receivable.

A selector finger 90 is provided with a tapered forward portion 92 which is dimensioned whereby to co-operate with adjacent faces 76 and 80 of the stop member and face 86 of block 84 for defining a substantially V-shaped aperture dimensioned to receive the end of an elongate edging strip.

As best illustrated in Fig. 6, the forward portion 92 of the selector finger is of appreciable width terminating in edge or face 93 which is in substantial axial alignment with aligning face 56 of vertical wall 105 of guide 52. This face or edge is engageable by edge 122 of strips 18 which are above and immediately adjacent the lowermost of said strips supported on the guides.

As used hereinafter, the term die, or selector member broadly refers to those means which mutually co-operate for providing an aperture the shape of which is generally complementary to the cross sectional area of the strip to be selected, and the component parts of which are so correlated as to define an aperture into which the end of only one strip member may be received at a time. In other words, the die, or selector member comprises front or interfering portion 76 of stop 74, block 84 and selector finger 90, see Fig. 5.

An ejector blade 94 is secured to and carried by block 96 which may be secured to and carried by an ejector bar or actuator member 98 suitably journaled for reciprocatory motion on table 58 and between laterally spaced guide channels 100 provided one in each of the laterally spaced guides 50 and 52.

A follower member 102 is preferably secured to and carried by block 96 for sliding engagement with a guideway 104 provided in the upper edge of vertical wall 105 of guide 52 to insure movement of ejector blade 94 in axial alignment with slot 95 defined by the adjacent faces of block 84 and front or interfering portion 76 of stop 74.

With reference now to Figs. 3 and 4, it will be noted that stop member 72 likewise includes portions 76, 78 and 80, as well as a block 84 having an inclined face 86, the same as in stop member 74.

An ejector blade 106 is secured to and carried by block 108 having an elongated aperture 110 therein (see Fig. 1) for the reception of fastening means such as bolts 112, the lower ends of which are adapted to be received in one or more of a plurality of axially aligned threaded holes 114 laterally spaced along the ejector bar. A follower 116 is secured to and carried by block 108 for sliding engagement with guideway 118 provided in the upper edge of vertical wall 119 of guide 50.

From the foregoing it will be noted that the operating characteristics of the ejector blades 94 and 106 are correlated in the sense that as one is being advanced the other will be retracted or withdrawn by an equal and corresponding amount.

Figure 11:
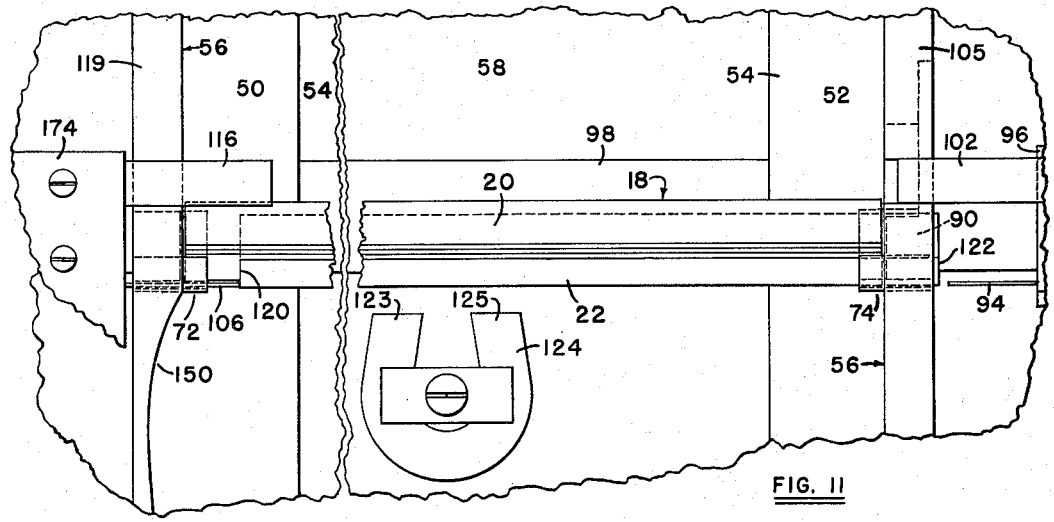
Figs. 11, 12 and 13 are schematic views illustrating the operational sequence of the device of Fig. 1.

With reference now to Fig. 11, it will be noted that ejector blade 106 will engage the left end 120 of the lowermost elongate strip 18 for shifting said strip axially relative to guides 50 and 52, stop members 72 and 74 and the other of the nested elongate members slidably supported upon the guides. This axial movement will result in the introduction of the other, or right end, 122, of the strip into the opening defined by portions 76, 78 and 80 of stop member 74, inclined face 86 of block 84 and the adjacent faces of end 92 of selector finger 90. As clearly disclosed in Fig. 11, the right ejector blade 94 has been withdrawn to the right by an amount sufficient to clear end 122 of the elongate strip member.

The numeral 124 denotes a magnet having poles 123 and 125 which are disposed in substantial spaced parallelism with the forward edge of elongate element 18, wherein the lateral spacing is of a dimension sufficient to enable the field of the magnet to be effective on strip 18.

With reference now to Figs. 2, 8 and 9, it will be noted that magnet 124 has been mounted for reciprocatory motion for disposing it in one or the other of two normal positions, viz., fully retracted by an amount sufficient to render ineffective the field of the magnet upon a strip 18 supported upon guideways 50 and 52, or to a fully raised position wherein its field will be effective upon an elongate strip.

Reciprocatory motion of the magnet may be provided by means of the linkage illustrated in Figs. 2, 8 and 9 wherein the numeral 126 denotes an elevator shaft journaled for axial movement in bore 128 of a mounting block 130 secured to and carried by the under face of table 58. A cam 132 is secured to and carried by shaft 134 rotatably mounted in bearings 136 suitably secured to and carried by the underside of the table. Cam follower arm 138 may be pivotally secured as at 140 to a bracket 142 secured to and carried by the under face of plate 146 which spans end supports 60. One end of arm 138 is pivoted to the lower end of elevator shaft 126 as at 143, the other end of said arm terminating in a follower roller 144 secured thereto as at 148. A spring 149 is provided for normally and yieldingly shifting arm 138 about pivotal support 140 for elevating elevator shaft 126 and maintaining follower roller 144 in contact with the outer periphery of cam 132.

Figure 12:
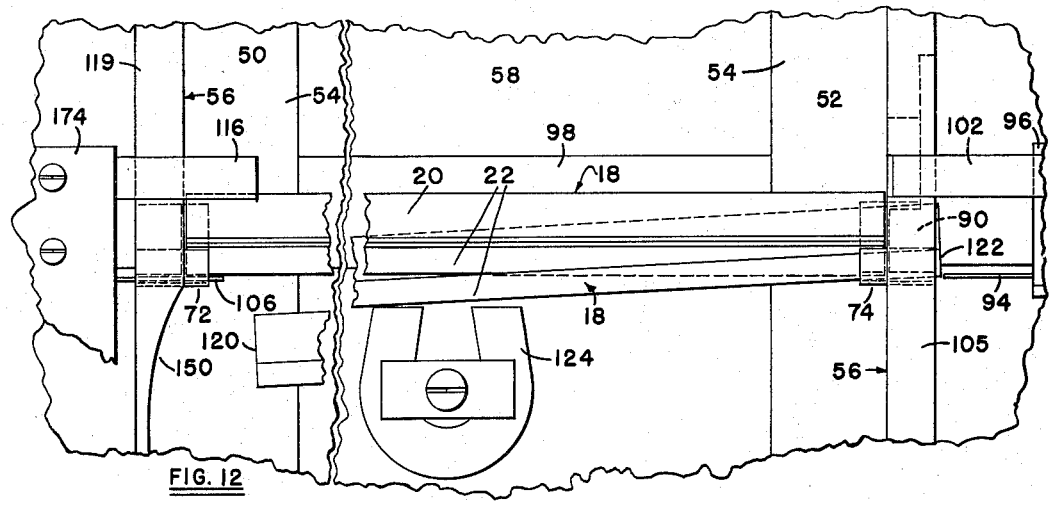

With reference now to Fig. 12, it will be noted that when magnet 124 is in an elevated position, it will attract those portions of elongate element 18 remote from stop member 74 whereby said element will be pivoted relative to and about die, or selector member and finger 90 for disposing end 120 of the strip below stop member 72.

At this point, and with particular reference to Figs. 1 and 12, it will be noted that the inner or alignment face 56 of vertical wall 119 of guide 50 has been undercut as at 150 below stop member 72, for increasing the lateral spacing between adjacent alignment faces 56 of guides 50 and 52.

Figure 13:
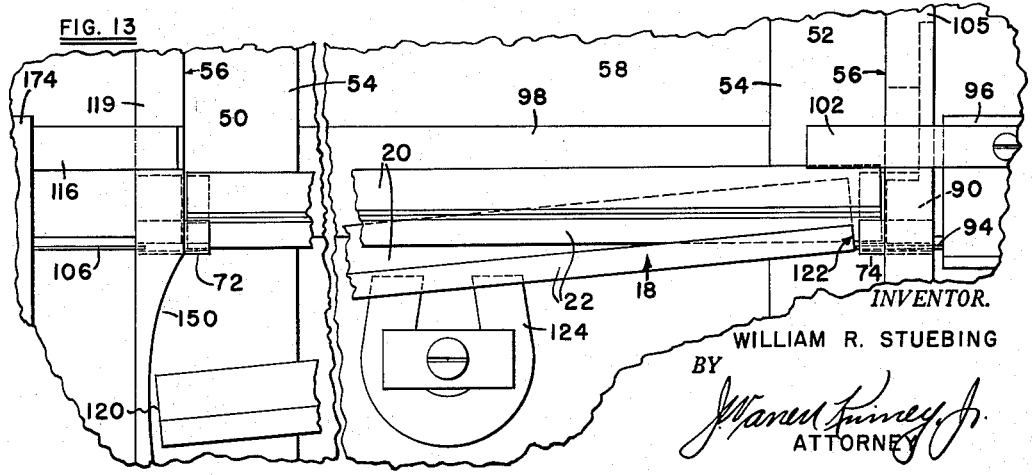

In Fig. 13 ejector blade 94 has been fully advanced to the left for engaging right end 122 of strip 18 for shifting it endwise by an amount sufficient to clear selector finger 90 and stop 74. The opposite or left end 120 of the strip will enter undercut portion 150 of guide 50, as illustrated.

Magnet 124 is shifted to its fully lowered, non-operative position incident to ejection of the elongate strip from die, or selector member 90 whereby the strip will be discharged onto portions 54 of guides 50 and 52 on which the opposite ends of said strip will be slidably supported.

As best disclosed in Fig. 1, downward movement of the elongate strip will result in that edge adjacent the left vertical wall 119 being urged to the right, that is, toward wall 105 of guide 52, thereby automatically aligning the ends of the strip with the ends of the other strips above stop members 72 and 74.

With reference to Figs. 8 and 10, it will be noted that a reciprocatory motion may be imparted to ejector bar 98 by means of lever 160 pivotally secured intermediate its length to plate 146 as at 1148. One end of the lever may be provided with a roller follower 162 which is constructed and arranged to ride upon cam 164 secured to and carried by drive shaft 134. The other end of the lever is connected to actuator bar 98 by means of a pin 166 which may, if desired, comprise the shank of a bolt 168 the end of which threadably engages a suitable aperture provided in the under surface of the ejector bar. A spring 171 is provided for normally and yieldingly urging lever 160 about its pivotal support 1148 for maintaining roller 162 in contacting relationship with the face of cam 164. Thus it will be observed that rotation of shaft 34 will result in the synchronized actuation of magnet 124 with the cyclic operation of ejector blades 94 and 106.

In those instances wherein the strip feeding device is associated with an edger, the lowermost edging strip 18 after being ejected from the selector member and discharged onto guides 50 and 52 will slide downwardly whereby its apex will engage forward edges 18 of finger bar 30, thereby positioning this strip as illustrated in Figs. 1 and 2 for the reception of the ends of a plurality of calendar sheets 26 and the subsequent crimping operation of the strip crimping device hereinbefore more fully described.

Axial alignment of the delivered strip may be assured by providing a stop element 170 (Fig. 1) engageable by edge 122 of the strip. The opposite strip edge 120 may be engaged by face 172 of register arm 174 depending from ejector block 108 to which it may be secured by a suitable fastening means 176, whereby the register arm will be actuated concurrently with ejector blades 94 and 106. In the preferred embodiment of the invention face 172 of the register arm will engage end 120 of the discharged strip 18 for shifting said strip to the right whereby its other end 122 will abut stop 170.

Each time ejector blade 106 axially shifts the lowermost of the elongate strip members supported on the guides above stops 72 and 74 into the die, or selector member, the register arm will axially shift the strip previously ejected by blade 106 into abutting relationship with stop 170. In this manner I have provided simple, effective yet highly efficient means for automatically aligning a discharged strip incident to the initial ejection of the next strip to be discharged by the strip feeding device.

Register arm 174 will, of course, be retracted to the position illustrated in Fig. 1 incident to movement of ejector blade 94 to the left incident to actuation of ejector bar 98.

Actuation of drive shaft 134 may be controlled by means of any suitable clutch assembly which will effect disengagement of the clutch after one full revolution of the shaft, such as, by way of example, is illustrated in Figs. 8, 14 and 15, wherein the numeral 180 denotes a spur gear suitably journaled for free rotation upon shaft 134. This gear may engage drive gear 182 secured to and carried by shaft 184 of a suitable source of power such as an electric motor 186. A clutch plate 188 having one or more interdental spaces 190 may be fixed to gear 180 as by pins 192, said plate being freely rotatable upon shaft 134.

A second clutch plate 194 keyed to the shaft includes an annular recessed portion 196 and a slotted portion 198 in which a U-shaped clutch key 200 is slidably mounted. Actuation of the clutch key is effected by spring 202 which normally and yieldingly urges the key toward plate 188 and in seating engagement within an interdental space thereof.

An arcuate clutch shifter blade 210 is suitably mounted for movement into and out of the space between the legs of the U-shaped clutch key; when removed the key will be urged into seating engagement with one of the interdental spaces 190 of the driving clutch plate 188 thereby driving clutch plate 194, shaft 132 and the various cams thereon. As disclosed in Fig. 14, the forward and lower portions of blade 210 taper to a narrow edge which is constructed and arranged to be automatically and normally inserted between face 212 of the annular recessed portion 196 and face 214 of clutch key 200 incident to rotation of clutch plate 194 toward the narrow edge of the blade. Introduction of the blade will automatically and progressively shift clutch key 200 rearwardly against the counter-force of spring 202, thereby withdrawing leg 216 from the interdental space 190, in which it was seated. In this manner I have provided simple yet highly effective means for automatically disengaging the clutch after each revolution thereof. Actuation of blade 210 in response to a positive, intentional act on the part of the operator will result in engagement of the clutch for driving shaft 134 in one complete revolution.

At this point it should be noted that various other driving elements are operatively associated with drive shaft 134 for operating the hammer bar, crimping blade and front pressure bar of the crimping mechanism illustrated in Fig. 2, however, since the present application is neither directed to nor concerned with the particular means used for driving the crimping mechanism, such details have been omitted from the present application.

In those instances in which the strip feeding device is associated with an edge crimper, a shield plate 220 (Fig. 2) which terminates in a lower inturned edge 222 may be provided for facilitating the introduction of the forward ends of sheets 26 into pocket 24 of strip 18. A plurality of laterally spaced paper fingers 224 may likewise be secured to and carried by paper finger bar 226 which is constructed and arranged whereby to spanningly engage vertical portions 105 and 119 of guides 50 and 52, being seated in slots 228, see Fig. 1, provided therein. As clearly illustrated in Fig. 2, sheets 26 are supported on fingers 224 above inclined surface 54 of the guides, thereby precluding contact of strips 18 with sheets 26 incident to being fed down edge 54 of the guides.

It should be understood that the die, or selector member may be constructed in such a manner as to accommodate strips having cross sectional areas other than those of the strips disclosed in Fig. 7, thereby greatly enhancing the utility of the device. It will likewise be noted that the present device may be simply adjusted for handling strip elements of different lengths, it being understood, however, that the overall length of the strip elements being fed at any one time are of substantially the same length. In order to adjust the device for handling strips of very different lengths, it is only necessary to loosen retaining means 68 and 112 for facilitating adjustment of blocks 66 and 108, respectively, along members 62 and 98.

In operation of the device a plurality of similar, elongate elements or strips, such as 18, are placed across and in spanning relationship with upper surface 54 of the laterally spaced guide and support members 50 and 52. The opposite ends of the forward edge of the lowermost strip will abuttingly engage stops 72 and 74, it being understood that the other strips disposed above the lowermost strip will be maintained in place upon guide members 50 and 52 solely by reason of their own weight.

When it is desired to feed or remove the lowermost of the strips, the clutch shifter blade 210 (Fig. 14) is suitably actuated for operatively interconnecting clutch plates 188 and 194 for connecting driving shaft 134 in driven relationship with motor 186 for turning shaft 134 throughout one complete revolution.

Rotation of shaft 134 will effect axial shifting of ejector bar 98 to the right (Figs. 1 and 11) by reason of the linkage illustrated in the right end of Fig. 8 and in Fig. 10. Motion of the ejector bar to the right will advance the free end of ejector blade 106 into contacting relationship with the free, left end, 120, of the lowermost strip 18 for thereby bodily shifting said strip to the right, whereby its right end 122 is received within the selector member comprising elements 74, 84 and 90 (see Fig. 5).

During this time magnet 124 is disposed in a fully elevated condition so that the left end of the lowermost strip, having been freed from stop member 72, will be attracted or drawn downwardly below stop 72 about its right end which is received within the selector member, see Fig. 12.

Further rotation of shaft 134 will shift the ejector bar to the left and simultaneously therewith the magnet will be lowered for rendering it ineffective upon the strip.

As the ejector bar continues to move to the left ejector blade 94 will engage the right end, 122, of the lowermost strip (the left end of which is positioned below stop 172 as illustrated in Fig. 12) after which the strip will be bodily ejected from the selector member (see Fig. 13) for thereby discharging the strip onto the guide members 50 and 52 below stops 72 and 74.

The ejected strip is then free to slide down guides 50 and 52 for presenting it in predetermined alignment. If desired, a registration arm 174 operatively secured relative to ejector bar 98 (Fig. 1) may be utilized to shift the having-been-ejected strip to the right for urging its right end against an abutment 170.

It should be understood that various changes and modifications in the structural details of the device may be made, within the scope of the appended claims, without departing from the spirit of the invention.

What is claimed is:

1. A feeding device for the lowermost of a plurality of nested, similar elongate elements comprising in combination, a die in axial alignment with and dimensioned to receive the end of the lowermost element, means engageable with the other end of the element for shifting it axially for inserting the first end in said die, means adjacent the die operable on the element while its one end is fully received within the die for pivoting said element relative to and while fully inserted in said die, and means for ejecting said element from the die.

2. A feeding device for elongate elements comprising, in combination, a guide for supporting a plurality of similar elongate elements with their longitudinal axes in substantial parallelism, stop means engageable by the lowermost of said elements, a die in axial alignment with said stop means and dimensioned to receive one end of an element, means engageable with the other end of the lowermost element for shifting it endwise relative to the guide support and the other similar elongate elements for inserting the first mentioned end in said die, means operable on the die-adpacent end of said element while fully inserted in said die for pivoting said element relative to and about said die member and for locating the second mentioned end of said element below said stop means, and means for ejecting said element from said die.

3. A feeding device for elongate elements comprising, in combination, a guide for supporting in nested relationship a plurality of similar elongate elements with their longitudinal axes in substantial parallelism, stop means engageable by the lowermost of said elements, a die in axial alignment with said stop means dimensioned to receive one end of the lowermost element, means engageable with the other end of the said lowermost element for shifting it endwise relative to the guide support and the other elongate elements for inserting its other end in said die, means operable on the central portion of said element while it is fully inserted in the die for pivoting said element relative to and about said die for locating the other end of said element below said stop means, said guide support extending beyond and below said stop means, and means for ejecting said element from said die and onto said guide support beyond and below said stop means.

4. A feeding device for elongate elements comprising, in combination, a pair of laterally spaced guides for supporting and aligning the opposite ends of a plurality of similar elongate elements with their longitudinal axes in substantial parallelism, axially aligned stop means in interfering relationship with each of said guide means for engaging the opposite ends of the lowermost of said elements, a die secured relative to one of said guide means in axial alignment with an end of an elongate element spanning said guide means and abutting said stop means, said die dimensioned to receive an end of an elongate element, pusher means in axial alignment with that stop means remote from said die engageable with the other end of the lowermost elongate element for shifting it endwise relative to said guide means, stop members and the other elongate elements for inserting its opposite end into said die, whereby that end of said element remote from the die will clear the stop means which it originally engaged, means operable on said element while fully inserted in the die for pivoting said element relative to and about said die for disposing that end remote from the die below its stop means, and other pusher means engaging that end of said element received within the die for ejecting it from said die by shifting it endwise by an amount sufficient to clear the stop means adjacent said die, thereby discharging said element onto said guides below said stop means.

5. A feeding device for elongate elements comprising, in combination, a pair of laterally spaced guides for supporting and aligning the opposite ends of a plurality of similar elongate elements with the longitudinal axes in substantial parallelism, stop means in interfering relationship with each of said guide means for engaging the front and rear ends of the lowermost of said elements, a die secured relative to one of said guide means and in axial alignment with the forward end of an elongate element spanning said guide means and engaging said stop means, said die dimensioned to receive the forward end of an elongate element, ejector means associated with that stop means remote from said die engageable with the rear end of said elongate element for shifting it endwise relative to said guide means, stop members and the other elongate elements and for inserting its forward end into said die and for simultaneously disengaging the rear end of said element from the stop means which it originally engaged, means operable on portions of said element remote from said selector member for pivoting said element while fully received within said die relative to and about said die for disposing that end remote from the die below its stop means, ejector means engaging the other end of said element for ejecting it from said die by shifting it endwise by an amount sufficient to clear the stop means adjacent said die, thereby discharging the element onto said guides below said stop means, an ejector bar located below the supporting surface of and spanning the said laterally spaced guides, both of said ejector means secured to and carried by said ejector bar, and means for imparting a reciprocatory motion to said bar.

6. A feeding device for elongate elements comprising, in combination, a pair of laterally spaced guides for supporting and aligning the opposite ends of a plurality of similar elongate elements with their longitudinal axes in substantial parallelism, axially aligned stops in interfering relationship with each of said guide means for engaging the opposite ends of the lowermost of said elements, a selector member secured relative to one of said guide means and in axial alignment with said stops, said member dimensioned to receive an end of an elongate element, an ejector associated with that stop remote from said selector member engageable with the other end of an element for shifting it endwise relative to said guide means, stops and the other elongate elements for inserting its opposite end into said selector member and for disengaging that end of said element remote from the selector member from its stop, magnetic means operable on said element for pivoting it relative to and about said selector member for disposing that end remote from the selector member below its stop, an ejector engaging the other end of said element for ejecting it from said selector member by shifting it endwise by an amount sufficient to clear the stop adjacent said selector member for discharging the element onto said guides below said stops, means for correlating the action of said ejectors whereby one is fully retracted while the other is extended, and means for rendering said magnetic means inoperative on said element incident to actuation of the second ejector for ejection of said element from said selector member.

7. A feeding device for the lowermost of a plurality of nested, similar elongate elements comprising, in combination, a stationary die dimensioned to receive an end of the lowermost elongate element, means for inserting an end of the element in said die, means for pivoting said elongate element about said die and while fully inserted therein, means for ejecting said element from the die, means for receiving the ejected element, and means for positioning said element in predetermined axial alignment on said receiving means.

8. A feeding device for elongate elements comprising, in combination, a guide for supporting in nested relationship a plurality of similar elongate elements with their longitudinal axes in substantial parallelism, stop means engageable by the lowermost of said elements, a die in axial alignment with said stop means and dimensioned to receive the forward end of an element, means engageable with the rear end of the lowermost element for shifting it endwise relative to the guide support and the forward elements for inserting its other end in said die, means operable on said elongate element while fully received within the die for pivoting said element relative to and about said die and for locating the rear end of said element below said stop means, said guide support extending beyond said stop means, means for ejecting said element from said die onto said guide support beyond said stop means, interfering means engageable by said element for limiting its forward travel relative to said guide support, an alignment stop, and means engageable with an end of said element remote from said stop for shifting it endwise for disposing its opposite end in abutting relationship with said alignment stop.

9. A feeding device for elongate elements comprising, in combination, a pair of laterally spaced guides for supporting and aligning the opposite ends of a plurality of similar elongate elements with their longitudinal axes in substantial parallelism, axially aligned stops in interfering relationship with each of said guide means for engaging the opposite ends of the lowermost of said elements, a selector member secured relative to one of said guide means and in axial alignment with said stops, said member dimensioned to receive an end of an elongate element, an ejector associated with that stop remote from said selector member engageable with the other end of an element for shifting it endwise relative to said guide means, stops and the other elongate elements for inserting its opposite end into selector member while moving that end remote from the selector member free of its stop, magnetic means for swinging the free end of said element for disposing said end below its stop, an ejector engaging the other end of said element for ejecting it from said selector member by shifting it endwise by an amount sufficient to clear the stop adjacent said selector member for discharging the element onto said guides below said stops, means for correlating the action of said ejectors whereby one is fully retracted while the other is extended, and means for rendering said magnetic means inoperative on said element incident to actuation of the second ejector for ejection of said element from said selector member.

10. A feeding device for the lowermost of a plurality of nested elongate elements comprising, in combination, a pair of laterally spaced guides for gravitationally supporting the opposite ends of said elements, a stationary die adjacent one of said guides dimensioned to receive one end of the lowermost of said elongate elements, pusher means adjacent the other guide for engaging the other end of the lowermost elongate element, means for imparting reciprocatory motion to said pusher means for imparting axial movement to said lowermost element transversely of said guides for inserting the first mentioned end of the element into said die, means between said guide members and adjacent said die operable upon the lowermost element only while its one end is fully received within said die for pivoting said element downwardly out of the plane of said pusher means, and means for ejecting said element from the die.

11. A feeding device for the lowermost of a plurality of nested elongate elements comprising, in combination, a pair of laterally spaced guides for gravitationally supporting the opposite ends of said elements, stop means in interfering relationship with said guides engageable by the lowermost of the elongate elements, a stationary die in axial alignment with the lowermost element adjacent one of said guides and dimensioned to receive one end of the lowermost of said elongate elements, pusher means adjacent the other guide for engaging the other end of the lowermost elongate element, means for imparting reciprocatory motion to said pusher means for imparting endwise axial movement to said lowermost element transversely of said guides for inserting the first mentioned end of the element into said die, means between said guide members and adjacent said die operable upon the lowermost element while its one end is fully received within said die for pivoting said element downwardly out of the plane of said pusher means, and other pusher means in axial alignment with said first pusher means dimensioned to engage that end of the element received within the die for ejecting said element from the die.

12. In a feeding device as described in claim 11, wherein the said pusher means are interconnected whereby the second pusher means is retracted and advanced incident to advance and retraction of the first mentioned pusher means.

References Cited in the file of this patent

UNITED STATES PATENTS

| | | |
|---|---|---|
| 1,058,144 | Blank | Apr. 8, 1913 |
| 1,058,258 | Phelps | Apr. 8, 1913 |
| 1,184,648 | Horton | May 23, 1916 |
| 2,555,861 | Reynolds et al. | June 5, 1951 |
| 2,567,223 | Maher et al. | Sept. 11, 1951 |